US010662397B2

(12) United States Patent
Ebert et al.

(10) Patent No.: US 10,662,397 B2
(45) Date of Patent: May 26, 2020

(54) AQUEOUS FORMULATIONS, THEIR MANUFACTURE, AND THEIR USE IN HARD SURFACE CLEANING

(71) Applicant: BASF SE, Ludwigshafen (DE)

(72) Inventors: Sophia Ebert, Mannheim (DE); Bjoern Ludolph, Ludwigshafen (DE); Christoph Mueller, Mannheim (DE); Stephan Hueffer, Ludwigshafen (DE); Alejandra Garcia Marcos, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 383 days.

(21) Appl. No.: 14/763,203

(22) PCT Filed: Feb. 4, 2014

(86) PCT No.: PCT/EP2014/052172
§ 371 (c)(1),
(2) Date: Jul. 24, 2015

(87) PCT Pub. No.: WO2014/131584
PCT Pub. Date: Sep. 4, 2014

(65) Prior Publication Data
US 2015/0361381 A1    Dec. 17, 2015

(30) Foreign Application Priority Data

Feb. 28, 2013   (EP) .................................. 13157185

(51) Int. Cl.
| | | |
|---|---|---|
| C11D 3/37 | (2006.01) | |
| C11D 1/75 | (2006.01) | |
| C11D 1/90 | (2006.01) | |
| C11D 1/66 | (2006.01) | |
| C08G 73/02 | (2006.01) | |
| C11D 1/72 | (2006.01) | |
| C11D 1/12 | (2006.01) | |

(52) U.S. Cl.
CPC .......... *C11D 3/3723* (2013.01); *C08G 73/024* (2013.01); *C08G 73/0206* (2013.01); *C08G 73/0213* (2013.01); *C11D 1/12* (2013.01); *C11D 1/66* (2013.01); *C11D 1/662* (2013.01); *C11D 1/72* (2013.01); *C11D 1/75* (2013.01); *C11D 1/90* (2013.01); *C11D 3/3788* (2013.01)

(58) Field of Classification Search
CPC .................................................. C11D 3/3723
See application file for complete search history.

(56) References Cited

U.S. PATENT DOCUMENTS

| | | | |
|---|---|---|---|
| 3,301,783 A | 1/1967 | Dickson et al. | |
| 4,597,898 A * | 7/1986 | Vander Meer | C08G 65/2624 510/321 |
| 5,565,146 A | 10/1996 | Jakubicki et al. | |
| 5,602,093 A * | 2/1997 | Haerer | C11D 1/825 510/422 |
| 8,901,059 B2 | 12/2014 | Evers et al. | |
| 2005/0153860 A1 | 7/2005 | Zhou et al. | |
| 2007/0149696 A1 * | 6/2007 | Hueffer | C08F 290/042 524/548 |
| 2007/0275868 A1 * | 11/2007 | Cooremans | C11D 3/3723 510/475 |
| 2008/0153983 A1 * | 6/2008 | Boeckh | C11D 3/3723 525/96 |
| 2009/0124528 A1 * | 5/2009 | Danziger | C11D 3/3723 510/224 |
| 2009/0215662 A1 | 8/2009 | Boeckh et al. | |
| 2010/0323942 A1 * | 12/2010 | Evers | C11D 3/33 510/236 |
| 2010/0323943 A1 * | 12/2010 | Evers | C11D 3/364 510/236 |
| 2011/0036374 A1 | 2/2011 | Schneiderman et al. | |
| 2011/0183883 A1 * | 7/2011 | Hahn | C11D 3/0073 510/514 |
| 2011/0312869 A1 | 12/2011 | Danzigr et al. | |
| 2013/0303425 A1 * | 11/2013 | Scialla | C11D 3/3723 510/235 |
| 2013/0303426 A1 * | 11/2013 | Scialla | C11D 3/3723 510/235 |
| 2014/0243557 A1 | 8/2014 | Altenhoff | |

FOREIGN PATENT DOCUMENTS

| | | |
|---|---|---|
| CN | 101448925 A | 6/2009 |
| DE | 2605212 A1 | 8/1977 |
| EP | 2014755 A2 | 1/2009 |
| GB | 1551127 | 8/1979 |
| JP | 60-106897 A | 6/1985 |
| JP | 2012-530184 A | 11/2012 |
| RU | 2073700 | 2/1997 |
| RU | 2527423 | 8/2014 |
| WO | 97/23546 A1 | 7/1997 |
| WO | 03/054132 A1 | 7/2003 |
| WO | 2005/063850 A1 | 7/2005 |
| WO | 2006/108857 A1 | 10/2006 |
| WO | 2007/135645 A2 | 11/2007 |
| WO | 2009/060059 A2 | 5/2009 |
| WO | 2009/060060 | 5/2009 |
| WO | 2009/060409 A1 | 5/2009 |
| WO | 2009/061980 A1 | 5/2009 |
| WO | 2009/061990 A1 | 5/2009 |
| WO | 2014/131585 A1 | 9/2014 |
| WO | 2014/131710 A1 | 9/2014 |

OTHER PUBLICATIONS

International Search Report dated Sep. 19, 2014 in PCT/EP2014/052172 filed Feb. 4, 2014.

(Continued)

*Primary Examiner* — Mark Eashoo
*Assistant Examiner* — M. Reza Asdjodi
(74) *Attorney, Agent, or Firm* — Oblon, McClelland, Maier & Neustadt, L.L.P.

(57) ABSTRACT

The present invention is directed towards aqueous formulations comprising (A) at least one alkoxylated polypropylenimine, (B) at least one non-ionic surfactant, selected from (B1) alkyl polyglycosides and (B2) alkoxylated $C_8$-$C_{14}$-Guerbet alcohols.

10 Claims, No Drawings

(56) References Cited

OTHER PUBLICATIONS

International Preliminary Report on Patentability dated Feb. 6, 2015 in Patent Application No. PCT/EP2014/052172.
U.S. Appl. No. 14/766,901, filed Aug. 10, 2015, Ebert, et al.
U.S. Appl. No. 14/765,149, filed Jul. 31, 2015, Hueffer, et al.
Combined Chinese Office Action and Search Report dated Apr. 28, 2017 in Patent Application No. 201480010277.0 (with English language translation and English translation of categories of cited documents).

* cited by examiner

AQUEOUS FORMULATIONS, THEIR MANUFACTURE, AND THEIR USE IN HARD SURFACE CLEANING

The present invention is directed towards aqueous formulations comprising
(A) at least one alkoxylated polypropylenimine, and
(B) at least one non-ionic surfactant, selected from
  (B1) alkyl polyglycosides and
  (B2) alkoxylated $C_8$-$C_{14}$-Guerbet alcohols.

Furthermore, the present invention is directed towards the use of aqueous formulations according to the invention for hard surface cleaning such as hand dishware cleaning applications. Furthermore, the present invention is directed towards a method of manufacture of formulations according to the invention.

Furthermore, the present invention is directed towards alkoxylated polypropylenimine with a linear polypropylenimine backbone that bears no hydroxyl groups. Furthermore, the present invention is directed towards a method for making an alkoxylated polypropylenimine with a linear polypropylenimine backbone that bears no hydroxyl groups.

Formulations for hard surface cleanings are still the field of developmental and research work. Improvement of the efficiency of current formulations is still of interest, since either more hard surfaces can be cleaned with the same amount of formulation, or less active matter needs to be used, and the environment can be spared sewage water with a higher amount of surfactant.

Various documents have disclosed the use of highly branched alkoxylated polyethylenimine as ingredient for cleaning formulations, such as EP 2 014 755, US 2007/0275868 and US 2011/0036374. However, the efficiency in particular for degreasing applications of the formulations disclosed may still leave room for improvement.

It was therefore an objective to provide formulations with improved hard surface cleaning properties, in particular with improved hand dishware cleaning properties. It was further an objective to provide a method for making formulations with improved hard surface cleaning properties, in particular with improved hand dishware cleaning properties.

Accordingly, the aqueous formulations defined in the outset have been found, hereinafter also briefly being referred to as formulations according to the invention. Formulations according to the invention comprise
(A) at least one alkoxylated polypropylenimine, hereinafter also being referred to as alkoxylated polypropylenimine (A) or alkoxylate (A), and
(B) at least one non-ionic surfactant, selected from
  (B1) alkyl polyglycosides, hereinafter also being referred to as surfactant (B1), and
  (B2) alkoxylated $C_8$-$C_{14}$-Guerbet alcohols, hereinafter also being referred to as surfactant (B2).

Alkoxylated polypropylenimine (A), surfactant (B1) and surfactant (B2) will be described in more detail below.

Alkoxylated polypropylenimine (A) comprises alkoxy side chains and a backbone of polypropylenimine. The polypropylenimine backbone can be linear, predominantly linear or branched, predominantly linear being preferred and linear being more preferred. The structure of the polypropylenimine backbone is depending on the type of synthesis of the respective polypropylenimine. In the context of the present invention, said polypropylenimine can also be referred to as "backbone", as "backbone of alkoxylate (A)" or as "backbone of alkoxylated polyproplylenimine (A)".

Polypropylenimines as defined in the context with present invention can also be regarded as polypropylenepolyamines. They bear at least 6 N-atoms per molecule in the form of amino groups, e.g., as $NH_2$-groups, as secondary amino groups or as tertiary amino groups.

The term "polypropylenimine" in the context of the present invention does not only refer to polypropylenimine homopolymers but also to polyalkylenimines containing NH—$CH_2$—$CH_2$—$CH_2$—NH structural elements or NH—$CH_2$—$CH(CH_3)$—NH structural elements together with other alkylene diamine structural elements, for example NH—$CH_2$—$CH_2$—NH structural elements, NH—$(CH_2)_4$—NH structural elements, NH—$(CH_2)_6$—NH structural elements or (NH—$(CH_2)_8$—NH structural elements but the NH—$CH_2$—$CH_2$—$CH_2$—NH structural elements or NH—$CH_2$—$CH(CH_3)$—NH structural elements being in the majority with respect to the molar share. Preferred polypropylenimines contain NH—$CH_2$—$CH_2$—$CH_2$—NH structural elements being in the majority with respect to the molar share, for example amounting to 60 mol-% or more, more preferably amounting to at least 70 mol-%, referring to all alkylenimine structural elements. In a special embodiment, polypropylenimine refers to those polyalkylene imines that bear one or zero alkylenimine structural element per molecule that is different from NH—$CH_2$—$CH_2$—$CH_2$—NH.

Branches may be alkylenamino groups such as, but not limited to —$CH_2$—$CH_2$—$NH_2$ groups or $(CH_2)_3$—$NH_2$-groups. Longer branches may be, for examples, —$(CH_2)_3$—$N(CH_2CH_2CH_2NH_2)_2$ groups. Highly branched polypropylenimines are, e.g., polypropylene dendrimers or related molecules with a degree of branching in the range from 0.25 to 0.95, preferably in the range from 0.30 to 0.80 and particularly preferably at least 0.5. The degree of branching can be determined for example by $^{13}$C-NMR or $^{15}$N-NMR spectroscopy, preferably in $D_2O$, and is defined as follows:

$$DB=D+T/D+T+L$$

with D (dendritic) corresponding to the fraction of tertiary amino groups, L (linear) corresponding to the fraction of secondary amino groups and T (terminal) corresponding to the fraction of primary amino groups.

Within the context of the present invention, highly branched polypropylenimines are polypropylenimines with DB in the range from 0.25 to 0.95, particularly preferably in the range from 0.30 to 0.90 and very particularly preferably at least 0.5.

In the context of the present invention, $CH_3$-groups are not being considered as branches.

Preferred polypropylenimine backbones are those that exhibit little or no branching, thus predominantly linear or linear polypropylenimine backbones.

In certain embodiments of the present invention, the polypropylenimine backbone of alkoxylated polypropylenimine (A) may be obtained by a catalytic polycondensation of propanolamine and, optionally, at least one further amino alcohol, by a catalytic poly-co-condensation of propandiol with propandiamine and, optionally, at least one further diol and/or at least one further diamine, and preferably of a catalytic polycondensation of propandiamine and, optionally, at least one further diamine, the latter polycondensation also being referred to as poly-transamination. Said further amino alcohol, said further diamine and said further diol, respectively, are selected from aliphatic amino alcohols, aliphatic diols and aliphatic diamines.

Examples of aminopropanols are 3-aminopropan-1-ol and 2-aminopropan-1-ol and mixtures thereof, 3-aminopropan-1-ol being preferred.

Optionally, up to 40 mol-% of aminopropanol may be replaced by a one or more aminoalcohols other than aminopropanol and bearing at least one primary or secondary amino group and at least one OH group, in particular up to 30 mol-%.

Examples of further amino alcohols are linear, branched or cyclic alkanolamines such as monoethanolamine, N,N-diethanolamine, aminobutanol, for example 4-aminobutan-1-ol, 2-aminobutan-1-ol or 3-aminobutan-1-ol, aminopentanol, for example 5-aminopentan-1-ol or 1-aminopentan-2-ol, aminodimethylpentanol, for example 5-amino-2,2-dimethylpentanol, aminohexanol, for example 2-aminohexan-1-ol or 6-aminohexan-1-ol, aminoheptanol, for example 2-aminoheptan-1-ol or 7-aminoheptan-1-ol, aminooctanol, for example 2-aminooctan-1-ol or 8-aminooctan-1-ol, aminononanol, for example 2-aminononan-1-ol or 9-aminononan-1-ol, aminodecanol, for example 2-aminodecan-1-ol or 10-aminodecan-1-ol, aminoundecanol, for example 2-aminoundecan-1-ol or 11-aminoundecan-1-ol, aminododecanol, for example 2-aminododecan-1-ol or 12-aminododecan-1-ol, aminotridecanol, for example 2-aminotridecan-1-ol, wherein the respective $\omega$-amino-$\alpha$-alcohols are preferred over their 1,2-isomers, 2-(2-aminoethoxy)ethanol, alkylalkanolamines, for example N-n-butylethanolamine, N-npropylethanolamine, N-ethylethanolamine, and N-methylethanolamine. Preference is given to monoethanolamine.

In a particular embodiment, the backbone of alkoxylated polypropylenimine (A) may be obtained by a catalytic polycondensation of 3-aminopropan-1-ol, without any additional aminoalcohol other than 3-aminopropan-1-ol.

Examples of propandiamines and propanediols to be poly-co-condensed for making the polypropylenimine backbone are being described below. The terms propandiamine and propylene diamine are being used interchangeably in the context of the present invention. Examples of propandiamines are propane-1,2-diamine and propane-1,3-diamine and mixtures thereof, propane-1,3-diamine being preferred. Examples of the respective propanediols are 1,2-propylene glycol and 1,3-propylene glycol and mixtures thereof, 1,3-propylene glycol being preferred. Particularly preferred are poly-co-condensations of 1,3-propylene glycol with propane-1,3-diamine.

Optionally, up to 40 mol-% of the sum of propandiamines and propanediols may be replaced by a one or more aliphatic diols other than propanediol and/or one or more aliphatic diamine other than propandiamine, in particular up to 30 mol-%.

Examples of further aliphatic diols are linear, branched or cyclic aliphatic diols. Special examples of aliphatic diols are ethylene glycol, 2-methyl-1,3-propanediol, butanediols, for example 1,4-butylene glycol or butane-2,3-diol or 1,2-butylene gylcol, pentanediols, for example neopentyl glycol or 1,5-pentanediol or 1,2-pentanediol, hexanediols, for example 1,6-hexanediol or 1,2-hexanediol, heptanediols, for example 1,7-heptanediol or 1,2-heptanediol, octanediols, for example 1,8-octanediol or 1,2-octanediol, nonanediols, for example 1,9-nonanediol or 1,2-nonanediol, decanediols, for example 1,10-decanediol or 1,2-decanediol, undecanediols, for example 1,11-undecanediol or 1,2-undecanediol, dodecanediols, for example 1,12-dodecanediol, 1,2-dodecanediol, tridecanediols, for example 1,13-tridecanediol or 1,2-tridecanediol, tetradecanediols, for example 1,14-tetradecanediol or 1,2-tetradecanediol, pentadecanediols, for example 1,15-pentadecanediol or 1,2-pentadecanediol, hexadecanediols, for example 1,16-hexadecanediol or 1,2-hexadecanediol, heptadecanediols, for example 1,17-heptadecanediol or 1,2-heptadecanediol, octadecanediols, for example 1,18-octadecanediol or 1,2-octadecanediol, wherein the respective $\alpha,\omega$-diols are preferred over their 1,2-isomers, 3,4-dimethyl-2,5-hexanediol, poly-THF, diethanolamines, for example butyldiethanolamine or methyldiethanolamine, dialcoholamines and trialcoholamines. Preference is given to ethylene glycol.

Examples of further aliphatic diamines are linear, branched or cyclic diamines. Special examples are ethylenediamine, butylenediamine, for example 1,4-butylenediamine or 1,2-butylenediamine, diaminopentane, for example 1,5-diaminopentane or 1,2-diaminopentane, diaminohexane, for example 1,6-diaminohexane or 1,5-diamino-2-methylpentane or 1,2-diaminohexane, diaminoheptane, for example 1,7-diaminoheptane or 1,2-diaminoheptane, diaminooctane, for example 1,8-diaminooctane or 1,2-diaminooctane, diaminononane, for example 1,9-diaminononane or 1,2-diaminononane, diaminodecane, for example 1,10-diaminodecane or 1,2-diaminodecane, diaminoundecane, for example 1,11-diaminoundecane or 1,2-diaminoundecane, diaminododecane, for example 1,12-diaminododecane or 1,2-diaminododecane, wherein the respective $\alpha,\omega$-diamines are preferred over their 1,2-isomers, 2,2-dimethylpropane-1,3-diamine, 4,7,10-trioxatridecane-1,13-diamine, 4,9-dioxadodecane-1,12-diamine, polyetheramines, and 3-(methylamino)propylamine. Preference is given to 1,2-ethylendiamine and 1,4-butandiamine.

In the context of the present invention, also compounds with two NH$_2$-groups and one tertiary amino group, such as, but not limited to N,N-bis(3-aminopropyl)methylamine, are being considered as diamines.

In a particular embodiment, the backbone of alkoxylated polypropylenimine (A) may be obtained by a catalytic poly-co-condensation of 1,3-propylene glycol with propane-1,3-diamine, without any additional diol or diamine other than 1,3-propylene glycol and propane-1,3-diamine, respectively.

The types of polycondensation or poly-co-condensation described above can be carried out in the presence of hydrogen, for example under a hydrogen pressure of from 1 to 10 MPa.

The types of polycondensation or poly-co-condensation described above can be carried out at a temperature in the range of from 20 to 250° C. Preferably, the temperature is at least 100° C. and preferably at most 200° C.

During the polycondensation or poly-co-condensation described above, the water formed can be removed, for example by distilling it off.

Catalysts suitable for the polycondensation or poly-co-condensation described above may preferably be homogeneous. Preferred examples of homogeneous catalysts for the polycondensation or poly-co-condensation described above are transition metal complexes that comprise one or more different transition metals, preferably at least one element from groups 8, 9 and 10 of the Periodic Table of the Elements, particularly preferably ruthenium or iridium. The specified transition metals are present in the form of transition metal complex compounds. Suitable ligands present in transition metal complex compounds suitable as catalysts are, for example, phosphines substituted with alkyl or aryl, polydentate phosphines substituted with alkyl or aryl which are bridged via arylene or alkylene groups, nitrogen-heterocyclic carbenes, cyclopentadienyl and pentamethylcyclopentadienyl, aryl, olefin ligands, hydride, halide, carboxylate, alkoxylate, carbonyl, hydroxide, trialkylamine, dialkylamine, monoalkylamine, nitrogen aromatics such as pyridine or pyrrolidine and polydentate amines. The transition metal complex compounds can comprise one or more different ligands specified above.

Particularly suitable monodentate phosphine ligands are triphenylphosphine, tritolylphosphine, tri-n-butylphosphine, tri-n-octylphosphine, trimethylphosphine and triethylphosphine, and also di(1-adamantyl)-n-butylphosphine, di(1-adamantyl)benzylphosphine, 2-(dicyclohexylphosphino)-1-phenyl-1H-pyrrole, 2-(dicyclohexylphosphino)-1-(2,4,6-trimethylphenyl)-1H-imidazole, 2-(dicyclohexylphosphino)-1-phenylindole, 2-(di-tert-butylphosphino)-1-phenylindole, 2-(dicyclohexylphosphino)-1-(2-methoxyphenyl)-1H-pyrrole, 2-(di-tert-butylphosphino)-1-(2-methoxyphenyl)-1H-pyrrole and 2-(di-tert-butylphosphino)-1-phenyl-1H-pyrrole. Very particular preference is given to triphenylphosphine, tritolylphosphine, tri-n-butylphosphine, tri-n-octylphosphine, trimethylphosphine and triethylphosphine, and also di(1-adamantyl)-n-butylphosphine, 2-(dicyclohexylphosphino)-1-phenyl-1H-pyrrole and 2-(di-tert-butylphosphino)-1-phenyl-1H-pyrrole.

Particularly suitable polydentate phosphine ligands are bis(diphenylphosphino)methane, 1,2-bis(diphenylphosphino)ethane, 1,2-dimethyl-1,2-bis(diphenylphosphino)ethane, 1,2-bis(dicyclohexylphosphino)ethane, 1,2-bis(diethylphosphino)ethane, 1,3-bis(diphenylphosphino)propane, 1,4-bis(diphenylphosphino)butane, 2,3-bis(diphenylphosphino)butane, 1,3-bis(diphenylphosphino)propane, 1,1,1-tris(diphenylphosphinomethyl)ethane, 1,1'-bis(diphenylphosphanyl)ferrocene and 4,5-bis(diphenylphosphino)-9,9-dimethylxanthene.

Furthermore, mention may preferably be made of nitrogen-heterocyclic carbenes as particularly suitable ligands for the catalyst for the polycondensation or poly-co-condensation described above. In this connection, those ligands which form water-soluble complexes with ruthenium are very preferred. Particular preference is given to 1-butyl-3-methylimidazolin-2-ylidene, 1-ethyl-3-methylimidazolin-2-ylidene, 1-methylimidazolin-2-ylidene and dipropylimidazolin-2-ylidene.

Particularly suitable ligands for the catalyst in the polycondensation or poly-co-condensation described above which may be mentioned are also cyclopentadienyl and its derivatives mono- to pentasubstituted with alkyl, aryl and/or hydroxy, such as, for example, methylcyclopentadienyl, pentamethylcyclopentadienyl, tetraphenylhydroxycyclopentadienyl and pentaphenylcyclopentadienyl. Further particularly suitable ligands are indenyl and its derivatives substituted as described for cyclopentadienyl.

Likewise particularly suitable ligands for the catalyst in polycondensations or poly-co-condensations described above are chloride, hydride and carbonyl.

The transition metal complex catalyst in the polycondensation or poly-co-condensation described above can comprise two or more different or identical ligands described above.

Homogeneous catalysts can be used either directly in their active form or else be produced starting from customary standard complexes such as, for example, Ru(p-cymene)Cl$_2$]$_2$, [Ru(benzene)Cl$_2$]$_y$, [Ru(CO)$_2$Cl$_2$]$_y$, where y is in each case in the range from 1 to 1000, [Ru(CO)$_3$Cl$_2$]$_2$, [Ru(COD) (allyl)], RuCl$_3$.H$_2$O, [Ru(acetylacetonate)$_3$], [Ru(DMSO)$_4$Cl$_2$], [Ru(Cp)(CO)$_2$Cl], [Ru(Cp)(CO)$_2$H], [Ru(Cp)(CO)$_2$]$_2$, [Ru(Cp)(CO)$_2$Cl], [Ru(Cp*)(CO)$_2$H], [Ru(Cp*)(CO)$_2$]$_2$, [Ru(indenyl)(CO)$_2$Cl], [Ru(indenyl)(CO)$_2$H], [Ru(indenyl)(CO)$_2$]$_2$, ruthenocene, [Ru(COD)Cl$_2$]$_2$, [Ru(Cp*)(COD)Cl] [Ru$_3$(CO)$_{12}$], [Ru(PPh$_3$)$_4$(H)$_2$], [Ru(PPh$_3$)$_3$(Cl)$_2$], [Ru (PPh$_3$)$_3$(CO)(Cl)$_2$], [Ru(PPh$_3$)$_3$(CO)(Cl)(H)], [Ru(PPh$_3$)$_3$ (CO)(H)$_2$] and [Ru(Cp)(methylallyl)$_2$], [Ru(bipyridine)$_2$Cl$_2$.2H2O], [Ru(COD)Cl$_2$]$_2$, [Ru(Cp*)(COD)Cl], [Ru$_3$(CO)$_{12}$], [Ru(tetraphenylhydroxy-cyclopentadienyl)(CO)$_2$H], [Ru(PMe$_3$)$_4$(H)$_2$], [Ru(PEt$_3$)$_4$(H)$_2$], [Ru(P(n-Pr)$_3$)$_4$(H)$_2$], [Ru(P(n-Bu)$_3$)$_4$(H)$_2$], [Ru(Pn-Octyl$_3$)$_4$(H)$_2$], [IrCl$_3$.H2O], KIrCl$_4$, K$_3$IrCl$_6$, [Ir(COD)Cl]$_2$, [Ir(cyclooctene)$_2$Cl]$_2$, [Ir(ethene)$_2$Cl]$_2$, [Ir(Cp)Cl$_2$]$_2$, [Ir(Cp*)Cl$_2$]$_2$, [Ir(Cp)(CO)$_2$], [Ir(Cp*)(CO)$_2$], [Ir(PPh$_3$)$_2$(CO)(H)], [Ir(PPh$_3$)$_2$(CO)(Cl)], [Ir(PPh$_3$)$_3$(Cl)] with the addition of the corresponding ligands, preferably the aforementioned mono- or polydentate phosphine ligands or the aforementioned nitrogen-heterocyclic carbenes, only under the reaction conditions.

For the purposes of the present invention, Cp means cyclopentdienyl and Cp* means pentamethylcyclopentadienyl. COD means cycloocta-1,5-dienyl, Et: ethyl, Me: methyl, Ph: phenyl, n-Pr: n-propyl, n-Bu: n-butyl.

In one embodiment of the present invention, the backbone synthesized according to polycondensations or poly-co-condensations described above have a hydroxyl value in the range of from 1 to 1,000 mg KOH/g, preferably from 2 to 500 mg KOH/g, most preferred from 10 to 300 mg KOH/g. The hydroxyl value can be determined according to DIN 53240.

In one embodiment of the present invention, the backbone of alkoxylate (A) synthesized according to polycondensations or poly-co-condensations described above have a primary amine value in the range of from 1 to 1000 mg KOH/g, preferably from 10 to 500 mg KOH/g, most preferred from 50 to 300 mg KOH/g. The primary amine value can be determined according to ASTM D2074-07.

In one embodiment of the present invention, the backbone of alkoxylate (A) synthesized according to polycondensations or poly-co-condensations described above have a secondary amine value in the range of from 1 to 1000 mg KOH/g, preferably from 10 to 500 mg KOH/g, most preferred from 50 to 300 mg KOH/g. The secondary amine value can be determined according to ASTM D2074-07.

In one embodiment of the present invention, the backbone of alkoxylate (A) synthesized according to polycondensations or poly-co-condensations described above have a tertiary amine value in the range of from 1 to 300 mg KOH/g, preferably from 5 to 200 mg KOH/g, most preferred from 10 to 100 mg KOH/g. The tertiary amine value can be determined according to ASTM D2074-07.

In one embodiment of the present invention, the molar share of tertiary N atoms is determined by $^{15}$N-NMR spectroscopy. In cases that tertiary amine value and result according to $^{15}$N-NMR spectroscopy are inconsistent, the results obtained by $^{15}$N-NMR spectroscopy will be given preference.

In a preferred embodiment of the present invention, the polypropylenimine backbone of alkoxylated polypropylenimine (A) may be obtained by a catalytic poly-transamination of propandiamine and, optionally, at least one further diamine.

Examples of propandiamines are propane-1,2-diamine and propane-1,3-diamine and mixtures thereof. Particularly preferred are poly-transaminations of propane-1,3-diamine.

Optionally, up to 40 mol-% of the propandiamine may be replaced by a one or more aliphatic diamine other than propandiamine, in particular up to 30 mol-%.

Examples of further aliphatic diamines are linear, branched or cyclic diamines. Special examples are ethylenediamine, butylenediamine, for example 1,4-butylenediamine or 1,2-butylenediamine, diaminopentane, for example 1,5-diaminopentane or 1,2-diaminopentane, diaminohexane, for example 1,6-diaminohexane or 1,2-diaminohexane or 1,5-diamino-2-methylpentane, diaminoheptane, for example 1,7-diaminoheptane or 1,2-diaminoheptane, diaminooctane, for example 1,8-diaminooctane or 1,2-diaminooctane, diaminononane, for example 1,9-diaminononane or 1,2-diaminononane, diaminodecane, for example 1,10-diaminodecane or 1,2-diaminodecane, diaminoundecane, for example 1,11-diaminoundecane or 1,2-diaminoundecane, diaminododecane, for example 1,12-diaminododecane or 1,2-diaminododecane, wherein the respective α,ω-diamines are preferred over their 1,2-isomers, 3,3'-dimethyl-4,4'-diaminodicyclohexylmethane, 4,4'-diaminodicyclohexylmethane, isophoronediamine, 2,2-dimethylpropane-1,3-diamine, 4,7,10-trioxatridecane-1,13-diamine, 4,9-dioxadodecane-1,12-diamine, polyetheramines, and 3-(methylamino)propylamine. Preference is given to 1,2-ethylendiamine and 1,4-butandiamine.

In the context of the present invention, compounds with 2 $NH_2$-groups and a tertiary amino group, such as, but not limited to N,N-bis(3-aminopropyl)methylamine, are also being considered as diamines.

In a particularly preferred embodiment, the backbone of alkoxylated polypropylenimine (A) may be obtained by a catalytic poly-transamination of propane-1,3-diamine, without any additional diamine other than propane-1,3-diamine.

Catalysts suitable for the poly-transamination of propandiamine and optionally at least one further aliphatic diamine are particularly heterogeneous catalysts that contain at least one or more transition metals selected from Fe, Co, Ni, Ru, Rh, Pd, Os, Ir, and Pt, preferably from Co, Ni, Ru, Cu and Pd, and particularly preferably Co, Ni or Cu, as well as mixtures of at least two of the above. The metals above may also be termed catalytically active metals in the context of the present invention.

In one embodiment of the present invention, a catalytically active metal can be doped with a promoter, for example, with at least one metal different from the catalytically active metal selected from Cr, Co, Mn, Mo, Ti, Sn, alkali metals, alkali earth metals, or phosphorus.

It is preferred to employ a Raney-type catalyst that can be obtained by activating an alloy of a catalytically active metal and at least one additional metal, in particular aluminum. Preferred are Raney-Nickel and Raney-Cobalt.

In one embodiment, supported Pd or supported Pt catalysts can be applied. Preferred support materials are carbon, for example as charcoal, as well as $Al_2O_3$, $TiO_2$, $ZrO_2$ and $SiO_2$.

Particularly preferred are catalysts that can be obtained by reduction of a catalyst precursor. A precursor may comprise a catalytically active component, and optionally at least one additional component selected from promoters and support materials. The so-called catalytically active component is usually a compound of the respective catalytically active metal, for example an oxide or a hydroxide, such as—but not limited to —CoO, CuO, NiO or mixtures from any combinations therefrom.

The poly-transamination of propandiamine and, optionally, further diamine(s) can be carried out in the presence of hydrogen, for example under a hydrogen pressure of from 1 to 400 bar, preferably under a hydrogen pressure in the range of from 1 to 200 bar and even more preferably under a hydrogen pressure in the range of from 1 to 100 bar.

The poly-transamination of propandiamine and, optionally, further diamine(s) can be carried out at a temperature in the range of from 50 to 200° C. Preferably, the temperature is in the range of from 90 to 180° C. and preferably in the range of from 120 to 160° C.

In one embodiment of the present invention, the poly-transamination of propandiamine and, optionally, further diamine(s) can be carried out at a pressure in the range of from 1 to 400 bar, preferably in the range of from 1 to 200 bar and even more preferably in the range of from 1 to 100 bar.

A backbone of alkoxylate (A) will be obtained. In embodiments in which a poly-transamination of propandiamine and, optionally, further diamine(s) has been performed, the respective backbone of alkoxylate (A) does not bear any hydroxyl groups. Therefore, its hydroxyl value is zero mg KOH/g, determined according to DIN 53240. In the context of the present invention, the term that the respective backbone of alkoxylate (A) does not bear any hydroxyl groups refers to the respective backbone before alkoxylation.

In embodiments in which a poly-transamination of diamine(s) has been performed, the respective backbone of alkoxylate (A) can have a primary amine value in the range of from 10 to 1000 mg KOH/g, preferably from 80 to 800 mg KOH/g, most preferred from 100 to 500 mg KOH/g. The primary amine value can be determined according to ASTM D2074-07.

In embodiments in which a poly-transamination of diamine(s) has been performed, the respective backbone of alkoxylate (A) can have a secondary amine value in the range of from 100 to 2000 mg KOH/g, preferably from 200 to 1500 mg KOH/g, most preferred from 300 to 1000 g KOH/g. The secondary amine value can be determined according to ASTM D2074-07.

In embodiments in which a poly-transamination of diamine(s) has been performed, the respective backbone of alkoxylate (A) can have tertiary amino groups in the range of from zero to 2 mol-%, referring to the total number of nitrogen in the respective polypropylenimine. They may result from branching or ring formation.

In one embodiment of the present invention, the molar share of tertiary N atoms is determined by $^{15}$N-NMR spectroscopy. In cases that tertiary amine value and result according to $^{15}$N-NMR spectroscopy are inconsistent, the results obtained by $^{15}$N-NMR spectroscopy will be given preference.

In a preferred embodiment of the present invention the number average molecular weight $M_n$ of the backbone of alkoxylate (A) is in the range of from 300 to 4,000 g/mol, preferably from 400 to 2,000 g/mol, determined by size exclusion chromatography.

In a preferred embodiment of the present invention the molar mass distribution $M_w/M_n$ of backbone of alkoxylate (A) is in the range from 1.2 to 20, preferably from 1.5 to 7.5.

In a preferred embodiment of the present invention, the cationic charge density of a backbone of alkoxylate (A) is in the range from 4 to 22 meq/g of dry matter, preferably in the range from 6 to 18 meq/g dry matter, determined at a pH value in the range of from 3 to 4, by titration.

In one embodiment of the present invention the total molecular weight (number average) of alkoxylate (A) is in the range of from 550 to 10,000 g/mole, determined by GPC.

Alkoxylated polypropylenimine (A) comprises alkoxy side chains. Said alkoxy side chains can be attached to the backbone by alkoxylation. Alkoxy side chains can be attached to the backbone by reacting the respective polypropylenimine with at least one alkylene oxide, for example ethylene oxide, propylene oxide, butylene oxide, pentylenoxide, decenyl oxide, dodecenyl oxide, or mixtures of at least two alkylene oxides of the foregoing. Preference is given to ethylene oxide, 1,2-propylene oxide and mixtures of ethylene oxide and 1,2-propylene oxide. If mixtures of at least two alkylene oxides are applied, they can be reacted random-wise or block-wise.

The reaction of the backbone with alkylene oxide can be performed, e.g., in the presence of a catalyst. Suitable catalysts are, for example, Lewis acids such as such as, for example, AlCl$_3$ or BF$_3$ etherate, BF$_3$, BF$_3$.H$_3$PO$_4$, SbCl$_5$.2H$_2$O and hydrotalcite. Preferred catalysts are selected from strong bases such as potassium hydroxide, sodium hydroxide, potassium methylate (KOCH$_3$) and sodium methylate (NaOCH$_3$), preferably from potassium hydroxide and sodium hydroxide.

In one embodiment of the present invention, alkoxylated polypropylenimine (A) is selected from those with alkylene oxide units and N atoms in a molar ratio in the range of from 1:1 to 100:1, preferably in the range of from 2:1 to 50:1, the N atoms resulting from alkylenimine units. The alkylenimine units are propylenimine units in their majority, for example at least 60 mol-%, referring to the total of alkylenimine units, preferably at least 70 mol-%.

In one embodiment of the present invention, alkoxylated polypropylenimine (A) is selected from those with alkylene oxide units and N atoms in a molar ratio in the range of from 1:1 to 100:1, preferably in the range of from 2:1 to 50:1, the N atoms resulting from propylenimine units, and no alkylenimine units other than propylenimine units being present.

Alkoxylated polypropylenimine (A) can be present in formulations according to the invention as such or as a derivative. Suitable derivatives are, for example, obtained by quaternization or by sulfatization (sulphation).

In one embodiment of the present invention, alkoxylated polypropylenimine (A) is quaternized, fully or partially, or sulfatized (sulphated), fully or partially. Preferably, alkoxylated polypropylenimine (A) is quaternized, fully or partially, and sulfatized, fully or partially, to an extent similar as the quaternization. Quaternization can be obtained, for example, by reacting an alkoxylated polypropylenimine (A) with an alkylation agent such as a C$_1$-C$_4$-alkyl halide, for example with methyl bromide, ethyl chloride, methyl iodide, n-butyl bromide, isopropyl bromide, or with a di-C$_1$-C$_4$-alkyl sulphate in the presence of a base, especially with dimethyl sulphate or with diethyl sulphate. Suitable bases are, for example, NaOH and KOH.

Combined quaternization and sulfatization can be achieved, e.g., by first reacting an alkoxylated polypropylenimine (A) with a di-C$_1$-C$_4$-alkyl sulphate in the presence of a base, then acidifying the reaction mixture obtained from quaternization, for example with a carboxylic acid, such as lactic acid, or with a mineral acid such as phosphoric acid, sulphuric acid or hydrochloric acid. In another embodiment, a quaternized alkoxylated polypropylenimine (A) can be reacted with a sulfatization reagent such as, but not limited to sulphuric acid (preferably 75 to 100% strength, more preferably 85 to 98% strength), oleum, SO$_3$, chlorosulphuric acid, sulphuryl chloride, amidosulphuric acid and the like. If sulphuryl chloride is selected as sulphatization agent chloride can be removed by aqueous work-up after sulphatization.

Formulations according to the invention also contain at least one non-ionic surfactant (B), in the context of the present invention also being referred to as surfactant (B). Surfactant (B) is selected from
(B1) alkyl polyglycosides, also being referred to as alkyl polyglycoside (B1) or surfactant (B1), and
(B2) alkoxylated C$_8$-C$_{14}$-Guerbet alcohols, also being referred to as alkoxylated C$_8$-C$_{14}$-Guerbet alcohols (B2) or surfactant (B2).

Alkyl polyglycosides and methods for their manufacture are known per se.

In one embodiment of the present invention, alkyl polyglycoside (B1) is selected from those of general formula (I)

wherein the integers are defined as follows:
R$^1$ is selected from C$_1$-C$_4$-alkyl, branched or preferably linear, for example methyl, ethyl, n-propyl, n-butyl, or preferably hydrogen,
R$^2$ is C$_3$-C$_{12}$-alkyl, branched or preferably linear, for example n-propyl, n-butyl, iso-butyl, n-pentyl, iso-amyl, n-hexyl, n-heptyl, iso-heptyl, n-octyl, iso-octyl, n-decyl or n-dodecyl.
G$^1$ selected from monosaccharides with 4 to 6 carbon atoms, x in the range of from 1.1 to 3.

In one embodiment of the present invention, R$^1$ and R$^2$ are selected independently from each other.

In a preferred embodiment of the present invention, R$^1$ and R$^2$ are selected interdependently from each other. For example, if R$^1$ is selected from ethyl, then R$^2$ is selected from n-butyl. In a further example R$^1$ is selected from C$_3$-alkyl, linear or branched and R$^2$ is selected from C$_5$-alkyl, linear or branched. In a further example R$^1$ is selected from Ca-alkyl, linear or branched, and R$^2$ is selected from C$_6$-alkyl, linear or branched.

In a preferred embodiment of the present invention, R$^1$ is selected from hydrogen and R$^2$ is selected from linear C$_6$-C$_{10}$-alkyl.

In another particularly preferred embodiment of the present invention, R$^1$ is n-C$_3$H$_7$ and R$^2$ is n-C$_5$H$_{11}$.

G$^1$ is selected from monosaccharides, preferably from tetroses, pentoses, and hexoses. Examples of tetroses are erythrose, threose, and erythulose. Examples of pentoses are ribulose, xylulose, ribose, arabinose, xylose and lyxose. Examples of hexoses are galactose, mannose and glucose. Monosaccharides may be synthetic or derived or isolated from natural products, hereinafter in brief referred to as natural saccharides, and natural saccharides being preferred. More preferred are the following natural monosaccharides: galactose, xylose, and in particular glucose. Monosaccharides can be selected from any of their enantiomers, naturally occurring enantiomers and naturally occurring mixtures of enantiomers being preferred.

The integer x is a number in the range of from 1.1 to 3, preferred are 1.1 to 2 and in particularly preferred are 1.15 to 1.9. In the context of the present invention, x refers to an average value, and x is not necessarily a whole number. In a specific molecule of surfactant (B1) only whole groups of G$^1$ can occur. In single molecules of surfactant (B1) there may be, for example, only one G$^1$ moiety or up to 15 G$^1$ moieties per molecule.

In single molecules of surfactant (B1) with 2 or more G$^1$ moieties, the monosaccharide groups (sugar molecules) can be linked in any position, for example, in 1,6-position, in 1,2-position or in 1,3-position and preferably in 1,6-position or 1,4-position. The linkage can be α or β.

Alkoxylated C$_8$-C$_{14}$-Guerbet alcohols (B2) and methods for their manufacture are known per se.

In one embodiment of the present invention, surfactant (B2) is selected from alkoxylated $C_8$-$C_{14}$-Guerbet alcohols bearing in the range of from 3 to 40 alkoxide units per mole, preferably 5 to 30 alkoxide units per mole and even more at least 8 alkoxide units per mole. Alkoxide units can be selected from ethylene oxide units, 1,2-propylene oxide units, 1,3-propylene oxide units, 1,2-butylene oxide units, 1,4-butylene oxide units, and combinations of at least two of the foregoing. In molecules with at least 3 alkoxide units of at least two of the foregoing, the different alkoxide units can be arranged randomly or block-wise.

The respective parent $C_8$-$C_{14}$-Guerbet alcohols can be selected from 2-ethylhexanol, 2-n-propylheptanol, 2-isopropyl-heptanol, 2-n-butyloctanol, and 2-n-pentylnonanol, preferred are 2-ethylhexanol, 2-n-propylheptanol, and 2-isopropyl-heptanol. More preference is given to 2-n-propylheptanol.

In many cases, surfactant (B2) exhibits a molecular weight distribution. In one embodiment of the present invention, $M_w/M_n$, of (B2) is in the range of from 1.1 to 5.

In one embodiment of the present invention, formulations according to the invention may contain at least one surfactant (B1) and at least one surfactant (B2).

Formulations according to the invention are aqueous formulations. This means that they contain at least one alkoxylated polypropylenimine (A) and at least one surfactant (B) and water.

Formulations according to the invention may contain at least one non-aqueous solvent such as, but not limited to ethanol, isopropanol, ethylene glycol or 1,2-propylene glycol. It is preferred, however, that the water content of formulations according to the invention outweighs the sum of the non-aqueous solvents. In other embodiments, formulations according to the invention do not contain any non-aqueous solvent.

In one embodiment of the present invention, formulations according to the invention have a total solids content in the range of from 1.1 to 40% by weight, based on total formulation, preferably 6 to 35% by weight and more preferably 25 to 30% by weight.

It has been found that formulations according to the invention are more efficient, for example with respect to dishwashing and degreasing, if surfactant (B) is present in comparably low amount. In one embodiment of the present invention, formulations according to the invention are selected from aqueous formulations containing
in total in the range of from 0.1 to 1.0% by weight of alkoxylated polypropylenimine (A), preferably from 0.1 to 1.5% by weight and even more preferred from 0.2 to 0.5% by weight,
in total in the range of from 0.5 to 10.0% by weight of surfactant (B), preferably from 1.0 to 5.0% by weight and even more preferably 1.0 to 3.0% by weight, selected from
(B1) alkyl polyglycosides and
(B2) alkoxylated $C_8$-$C_{14}$-Guerbet alcohols,
and, optionally, in total in the range of from 0.1 to 38.5% by weight of at least one surfactant (C), selected from anionic surfactants, amphoteric surfactants and amine oxide surfactants, in the context of the present invention also being referred to anionic surfactants (C), amphoteric surfactants (C), or amine oxide surfactants (C), respectively, or generally referred to as surfactants (C),
percentages being based on the total weight of the respective aqueous formulation.

One or more surfactants (C) may optionally be present in formulations according to the invention and are being described below in more detail. Surfactant (C) is different from surfactant (B).

Examples of suitable anionic surfactants (C) are alkali metal and ammonium salts of $C_8$-$C_{12}$-alkyl sulfates, of $C_{12}$-$C_{18}$-fatty alcohol polyether sulfates, of sulfuric acid half-esters of ethoxylated $C_4$-$C_{12}$-alkylphenols (ethoxylation: 3 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{12}$-$C_{18}$-alkylarylsulfonic acids. Preference is given to the alkali metal salts of the aforementioned compounds, particularly preferably the sodium salts.

In one embodiment of the present invention, anionic surfactants (C) are selected from fatty alcohol polyether sulfates, which, within the context of the present invention, are in particular sulfuric acid half-esters of ethoxylated $C_{12}$-$C_{18}$-alkanols (ethoxylation: 3 to 50 mol of ethylene oxide/mol), preferably of n-$C_{12}$-$C_{18}$-alkanols.

Examples of amphoteric surfactants (C) are those that bear a positive and a negative charge in the same molecule under use conditions. Preferred examples of amphoteric surfactants are so-called betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants (C) are compounds of the general formula (II)

$$R^3R^4R^5N \rightarrow O \qquad (II)$$

wherein $R^3$, $R^4$ and $R^5$ are selected independently from each other of aliphatic, cycloaliphatic or or $C_2$-$C_4$-alkylene $C_{10}$-$C_{20}$-alkylamido moieties. Preferably, $R^3$ is selected from $C_8$-$C_{20}$-alkyl or $C_2$-$C_4$-alkylene $C_{10}$-$C_{20}$-alkylamido and $R^4$ and $R^5$ are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

In one embodiment of the present invention, formulations according to the invention comprise at least one anionic surfactant (C) and at least one amine oxide surfactant (C).

In one embodiment of the present invention, formulations according to the invention may contain one or more adjunct ingredients. Examples of adjunct ingredients are enzymes, for example proteases, lipases, cellulases, hemicellulases. Other examples of adjunct ingredients are dyestuffs and fragrances. Examples of dyestuffs are Acid Blue 9, Acid Yellow 3, Acid Yellow 23, Acid Yellow 73, Pigment Yellow 101, Acid Green 1, Solvent Green 7, and Acid Green 25. Other examples of adjunct ingredients are rheology modifiers, for example thickeners, or NaCl. Other examples of adjunct ingredients are biocides, for example 1,2-benzisothiazolin-3-one ("BIT") (commercially available as Proxel® grades from Avecia Lim.) or alkali metal salts thereof; other suitable biocides are 2-methyl-2H-isothiazol-3-one ("MIT") and 5-chloro-2-methyl-2H-isothiazol-3-one ("CIT"), also 2-bromo-2-nitropropane-1,3-diol, benzalkonium chlorides and 4,4'-dichloro-2-hydroxydiphenyl ether. Other examples of adjunct ingredients are stabilizers, such as UV absorbants, for example benzophenone, sodium benzotriazolyl butylphenol sulfonate and ESQ like Tris(tetramethylhydroxypiperidinol)citrate. Other types of stabilizers are antioxidants such as, but not limited to tocopherol BHT, phenolic antioxidants such as pentaerythritol tetrakis (3-(3,5-di-tert-butyl-4-hydroxyphenyl)propionate), and non-phenolic antioxidants such as didodecyl 3,3'-thiodipropionate.

In one embodiment of the present invention, formulations according to the invention may contain at least one organic solvent, preferably selected from water-miscible organic solvents such as ethanol, isopropanol, ethylene glycol, and 1,2-propane diol.

In one embodiment of the present invention, formulations according to the invention have a pH value in the range of from 5 to 10, preferably from 6 to 9.

In one embodiment of the present invention, formulations according to the invention exhibit a dynamic viscosity at 23° C. in the range of from 500 to 2200 mPa·s (Brookfield viscosimeter, spindel No. 2, 50 rpm).

Preferably, formulations according to the invention are free from bleaching agents such as peroxides.

A further aspect of the present invention is the use of formulations according to the invention for cleaning hard surfaces. A further aspect of the present invention is a method for cleaning hard surfaces by using at least one formulation according to the present invention.

Hard surfaces as used in the context with the present invention are defined as surfaces of water-insoluble and—preferably—non-swellable materials. In addition, hard surfaces as used in the context of the present invention are insoluble in acetone, white spirit (mineral turpentine), and ethyl alcohol. Hard surfaces as used in the context of the present invention preferably also exhibit resistance against manual destruction such as scratching with fingernails. Preferably, they have a Mohs hardness of 3 or more. Examples of hard surfaces are glassware, tiles, stone, china, enamel, concrete, leather, steel, other metals such as iron or aluminum, furthermore wood, plastic, in particular melamine resins, polyethylene, polypropylene, PMMA, polycarbonates, polyesters such as PET, furthermore polystyrene and PVC, and furthermore, silicon (wafers) surfaces. Particularly advantageous are formulations according to the invention when used for cleaning hard surfaces that are at least part of structured objects. In the context, such structured objects refer to objects having, e.g. convex or concave elements, notches, furrows, corners, or elevations like bumps.

Preferred hard surfaces are selected from hard surfaces being part of a dishware, glass, cutlery, or kitchen utensils. Kitchen utensils are, for example, but not limited to pots, woks, barbecue parts soiled with grease, furthermore pans and garlic presses.

In one embodiment of the present invention, formulations according to the invention serve as concentrate, and for the hand dish-wash application they can be diluted with water, for example in a volume ratio formulation/water of 1:1 to 1:1,000.

When used for hand dish-wash applications, formulations according to the invention display excellent properties. In particular, they display excellent degreasing properties.

A further aspect of the present invention is a process for manufacturing of formulations according to the invention, in the context of the present invention also referred to as formulation process according to the invention. The formulation process according to the invention comprises the step of mixing (A) at least one alkoxylated polypropylenimine,
(B) at least one non-ionic surfactant, selected from
   (B1) alkyl polyglycosides and
   (B2) alkoxylated $C_8$-$C_{14}$-Guerbet alcohols,
and, optionally,
(C) at least one surfactant selected from anionic surfactants (C), amphoteric surfactants (C), or amine oxide surfactants (C), and, optionally,
(D) at least one adjunct ingredient.

In one embodiment of the present invention the formulation process according to the invention is being carried out at a temperature in the range of from 10° C. to 50° C., preferably at ambient temperature.

The mixing step can be performed by shaking, or preferably by stirring.

In a preferred embodiment, the formulation process according to the invention is carried out by mixing at least one non-ionic surfactant (B) with water and, optionally, with at least one surfactant (C), and then adding alkoxylated polypropylenimine (A).

A further aspect of the present invention are alkoxylated polypropylenimines with a linear polypropylenimine backbone that bears no hydroxyl groups, in the context of the present invention also being referred to as graft copolymers according to the invention.

Graft copolymers according to the invention comprise alkoxy side chains and a linear backbone of polypropylenimine. Polypropylenimines as defined in the context with the present invention can also be regarded as polypropylenepolyamines. They bear at least 6 N-atoms per molecule in the form of amino groups, e.g., as $NH_2$-groups or as secondary amino groups.

The term polypropylenimine in the context of the present invention will not solely refer to polypropylenimine homopolymers but also to polyalkylenimines containing NH—$CH_2$—$CH_2$—$CH_2$—NH structural elements or NH—$CH_2$—$CH_2$—NH structural elements, NH—$(CH_2)_4$—NH structural elements, NH—$(CH_2)_6$—NH structural elements or (NH—$(CH_2)_8$—NH structural elements but the NH—$CH_2$—$CH_2$—$CH_2$—NH structural elements or NH—$CH_2$—$CH(CH_3)$—NH structural elements or NH—$CH_2$—$CH(CH_3)$—NH structural elements being in the majority with respect to the molar share. Preferred polypropylenimines contain NH—$CH_2$—$CH_2$—$CH_2$—NH structural elements being in the majority with respect to the molar share, for example amounting to 60 mol-% or more, more preferably amounting to at least 70 mol-%, referring to all alkylene structural elements. In a special embodiment, polypropylenimine refers to that bear one or zero alkylenimine structural element per molecule that is different from NH—$CH_2$—$CH_2$—$CH_2$—NH.

The backbone of graft copolymers according to the invention does not bear any hydroxyl groups. Therefore, its hydroxyl value is zero mg KOH/g, determined according to DIN 53240. In the context of the present invention, the term that the backbone of a graft copolymer according to the invention does not bear any hydroxyl groups refers to the respective backbone before alkoxylation.

The backbone of graft copolymers according to the invention can have can have a primary amine value in the range of from 10 to 1000 mg KOH/g, preferably from 80 to 800 mg KOH/g, most preferred from 100 to 500 mg KOH/g. The primary amine value can be determined according to ASTM D2074-07.

The backbone of graft copolymers according to the invention can have a secondary amine value in the range of from 100 to 2000 mg KOH/g, preferably from 200 to 1500 mg KOH/g, most preferred from 300 to 1000 g KOH/g. The secondary amine value can be determined according to ASTM D2074-07.

The backbone of graft copolymers according to the present invention preferably does not bear any tertiary amino groups.

In one embodiment of the present invention, the molar share of tertiary N atoms is determined by $^{15}N$ NMR spectroscopy.

In a preferred embodiment of the present invention the number average molecular weight $M_n$ of the backbone of graft copolymers according to the invention is in the range of from 300 to 4,000 g/mol, preferably from 400 to 2,000 g/mol, determined by size exclusion chromatography.

In a preferred embodiment of the present invention the molar mass distribution $M_w/M_n$ of the backbone of graft copolymers according to the invention is in the range from 1.2 to 20, preferably from 1.5 to 7.5.

In a preferred embodiment of the present invention, the cationic charge density of a backbone of graft copolymers according to the invention is in the range from 4 to 22 meq/g of dry matter, preferably in the range from 6 to 18 meq/g dry matter, determined at a pH value in the range of from 3 to 4, by titration.

In one embodiment of the present invention the total molecular weight (number average) of graft copolymers according to the invention is in the range of from 550 to 10,000 g/mole, determined by GPC.

In one embodiment of the present invention, graft copolymers according to the invention can have a Hazen colour number in the range of from 10 to 800, preferably in the range of from 50 to 650 and more preferably in the range of from 100 to 500. The Hazen colour number can be determined according to DIN EN ISO 6271-1 or 6271-2.

In one embodiment of the present invention, graft copolymers according to the invention have a metal content in the range of from 1 to 5 ppm, determined, e.g., by atom absorption spectroscopy.

In one embodiment of the present invention, graft copolymers according to the invention have alkylene oxide units and alkylenimine units in a molar ratio in the range of from 1:1 to 100:1, preferably 2:1 to 50:1.

In one embodiment of the present invention, graft copolymers according to the invention exhibit a base value in the range of from 0.5 to 5 mg KOH/g. The base value is advantageously determined essentially according to ASTM D4739-11.

In one embodiment of the present invention, graft copolymers according to the invention are selected from those having a polypropylenimine backbone with a molecular weight $M_n$ in the range of from 300 to 4,000 g/mol, preferably 400 to 2,000 g/mol.

In another embodiment, graft copolymers according to the invention can be derivatized, for example, by quaternization or by sulfatization.

In one embodiment of the present invention, alkoxylated polypropylenimine (A) is quaternized, fully or partially, or sulfatized, fully or partially. Preferably, alkoxylated polypropylenimine (A) is quaternized, fully or partially, and sulfatized, fully or partially, to an extent similar as the quaternization. Quaternization can be accomplished, for example, by reacting an alkoxylated polypropylenimine (A) with an alkylation agent such as a $C_1$-$C_4$-alkyl halide, for example with methyl bromide, ethyl chloride, methyl iodide, n-butyl bromide, isopropyl bromide, or with a di-$C_1$-$C_4$-alkyl sulphate in the presence of a base, especially with dimethyl sulphate or with diethyl sulphate. Suitable bases are, for example, NaOH and KOH.

Combined quaternization and sulfatization can be achieved, e.g., by first reacting an alkoxylated polypropylenimine (A) with a di-$C_1$-$C_4$-alkyl sulphate in the presence of a base, then acidifying the reaction mixture obtained from quaternization, for example with a carboxylic acid, such as lactic acid, or with a mineral acid such as phosphoric acid, sulphuric acid or hydrochloric acid. In another embodiment, a quaternized alkoxylated polypropylenimine (A) can be reacted with a sulfatization reagent such as, but not limited to sulphuric acid (preferably 75 to 100% strength, more preferably 85 to 98% strength), oleum, $SO_3$, chlorosulphuric acid, sulphuryl chloride, amidosulphuric acid and the like. If sulphuryl chloride is selected as sulphatization agent chloride can be removed by aqueous work-up after sulphatization.

A further aspect of the present invention is a process for manufacture of the graft copolymers according to the invention, hereinafter also being referred to as process according to the invention. In one embodiment, the process according to the invention comprises the following steps:
  (a) reacting propandiamine and optionally at least one further aliphatic diamine in the presence of a catalyst under formation of a polypropylenimine that is free of hydroxyl groups,
  (b) reacting the polypropylenimine obtained according to step (a) with at least one alkylene oxide.

The above steps are also being referred to as step (a) or step (a) of the process according to the invention and as step (b) or step (b) of the process according to the invention, respectively.

In a preferred embodiment of the present invention, step (a) of the process according to the invention may be performed by a poly-transamination (polycondensation) of propandiamine and, optionally, at least one further diamine in the presence of a catalyst.

Examples of propandiamines are propane-1,2-diamine and propane-1,3-diamine and mixtures thereof. Particularly preferred are poly-condensations of propane-1,3-diamine.

Optionally, up to 40 mol-% of the propandiamine may be replaced by a one or more aliphatic diamine other than propandiamine, in particular up to 30 mol-%.

Examples of further aliphatic diamines are linear, branched or cyclic diamines. Special examples are ethylenediamine, butylenediamine, for example 1,4-butylenediamine or 1,2-butylenediamine, diaminopentane, for example 1,5-diaminopentane or 1,2-diaminopentane, diaminohexane, for example 1,6-diaminohexane or 1,2-diaminohexane or 1,5-diamino-2-methylpentane, diaminoheptane, for example 1,7-diaminoheptane or 1,2-diaminoheptane, diaminooctane, for example 1,8-diaminooctane or 1,2-diaminooctane, diaminononane, for example 1,9-diaminononane or 1,2-diaminononane, diaminodecane, for example 1,10-diaminodecane or 1,2-diaminodecane, diaminoundecane, for example 1,11-diaminoundecane or 1,2-diaminoundecane, diaminododecane, for example 1,12-diaminododecane or 1,2-diaminododecane, 2,2-dimethylpropane-1,3-diamine, 4,7,10-trioxatridecane-1,13-diamine, 4,9-dioxadodecane-1,12-diamine, polyetheramines, and 3-(methylamino)propylamine. Preference is given to 1,2-ethylendiamine and 1,4-butandiamine.

In the context of the present invention, compounds with 2 $NH_2$-groups and a tertiary amino group, such as, but not limited to N,N-bis(3-aminopropyl)methylamine, are also being considered as diamines.

In a particularly preferred embodiment, the backbone of the graft copolymer according to the invention may be obtained by a poly-transamination of propane-1,3-diamine, without any additional diamine other than propane-1,3-diamine, in the presence of a catalyst.

Catalysts suitable for step (a) of the process according to the invention are particularly heterogeneous catalysts that contain at least one or more transition metals selected from Fe, Co, Ni, Ru, Rh, Pd, Os, Ir, and Pt, preferably from Co, Ni, Ru, Cu and Pd, and particularly preferably Co, Ni or Cu, as well as mixtures of at least two of the above. The metals above may also be termed catalytically active metals in the context of the present invention.

In one embodiment of the present invention, a catalytically active metal can be doped with a promoter, for example, with at least one metal different from the catalytically active metal selected from Cr, Co, Mn, Mo, Ti, Sn, alkali metals, alkali earth metals, or phosphorus.

It is preferred to employ a Raney-type catalyst that can be obtained by activating an alloy of a catalytically active metal and at least one additional metal, in particular aluminum. Preferred are Raney-Nickel and Raney-Cobalt.

In one embodiment of the process according to the invention, supported Pd or supported Pt catalysts can be applied. Preferred support materials are carbon, for example as charcoal, as well as $Al_2O_3$, $TiO_2$, $ZrO_2$ and $SiO_2$.

Particularly preferred are catalysts that can be obtained by reduction of a catalyst precursor. A precursor may comprise a catalytically active component, and optionally at least one additional component selected from promoters and support materials. The so-called catalytically active component is usually a compound of the respective catalytically active metal, for example an oxide or a hydroxide, such as—but not limited to —CoO, CuO, NiO or mixtures from any combinations therefrom.

Step (a) of the process according to the invention can be carried out in the presence of hydrogen, for example under a hydrogen pressure of from 1 to 400 bar, preferably under a hydrogen pressure in the range of from 1 to 200 bar and even more preferably under a hydrogen pressure in the range of from 1 to 100 bar.

Step (a) of the process according to the invention can be carried out at a temperature in the range of from 50 to 200° C. Preferably, the temperature is in the range of from 90 to 180° C. and preferably in the range of from 120 to 160° C.

In one embodiment of the present invention, step (a) of the process according to the invention can be carried out at a pressure in the range of from 1 to 400 bar, preferably in the range of from 1 to 200 bar and even more preferably in the range of from 1 to 100 bar.

During step (a) of the process according to the invention, it is preferred to remove the ammonia evolved.

Step (b) of the process according to the invention comprises reacting the polypropylenimine obtained in step (a) with at least one alkylene oxide, for example ethylene oxide, propylene oxide, butylene oxide, pentylene oxide, decenyl oxide, dodecenyl oxide, or mixtures of at least two alkylene oxides of the foregoing. Preference is given to ethylene oxide, 1,2-propylene oxide and mixtures of ethylene oxide and 1,2-propylene oxide. If mixtures of at least two alkylene oxides are applied, they can be reacted random-wise or block-wise.

Step (b) of the process according to the invention carried out in the presence of a catalyst. Suitable catalysts are, for example, selected from strong bases such as potassium hydroxide, sodium hydroxide, sodium or potassium alkoxides such as potassium methylate ($KOCH_3$), potassium tert-butoxide, sodium ethoxide and sodium methylate ($NaOCH_3$), preferably from potassium hydroxide and sodium hydroxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polypropylenimine and alkylene oxide.

In one embodiment of the present invention, step (b) of the process according to the invention is carried out at temperatures in the range of from 90 to 240° C., preferably from 120 to 180° C., in a closed vessel.

In one embodiment of the present invention, step (b) of the process according to the invention is carried out at a pressure in the range of from 1 to 10 bar, preferably 1 to 8 bar.

In one embodiment of the present invention, alkylene oxide(s) is/are introduced to polypropylenimine from step (a) and optionally to the catalyst under the vapour pressure of the alkylene oxide or of the respective mixture of alkylene oxides at the selected reaction temperature. Alkylene oxide(s) can be introduced in pure form or, as an alternative, be diluted up to 30 to 60% by volume with an inert gas such as a rare gas or nitrogen. This measure affords additional safety against explosion-like polyaddition of the alkylene oxide.

In case several alkylene oxides are being introduced polyether chains will be formed in which the different alkylene oxide units are distributed virtually randomly. Variations in the distribution of the units along the polyether chain can arise due to differing reaction rates of the alkylene oxides. Variations in the distribution of the units along the polyether chain can be achieved arbitrarily by continuously introducing an alkylene oxide mixture of program-controlled composition as well. In case different alkylene oxides are reacted subsequently, then polyether chains with a block-type distribution of the alkylene oxide units are obtained.

In a preferred embodiment of the present invention, step (b) can consist of two or more sub-steps, of which the first sub-step consists in initially undertaking only an incipient alkoxylation of the polypropylene imine resulting from step (a). In the incipient alkoxylation, the polypropylene imine resulting from step (a) is reacted with a portion of the total amount of alkylene oxide used that corresponds to 1 mole of alkylene oxide per mole of NH moiety. The incipient alkoxylation is generally undertaken in the absence of a catalyst, preferably in an aqueous solution.

In one embodiment of the present invention, the incipient alkoxylation can be performed at a reaction temperature from 70 to 200° C., preferably from 80 to 160° C.

In one embodiment of the present invention, the incipient alkoxylation may be affected at a pressure of up to 10 bar, preferably up to 8 bar.

In a second sub-step and—optionally, in subsequent sub-steps—the further alkoxylation is then effected by subsequent reaction with alkylene oxide. The further alkoxylation is typically undertaken in the presence of a catalyst.

The second sub-step—and the optional subsequent sub-steps—may each be undertaken in bulk, embodiment (i), or in an organic solvent, embodiment (ii). In embodiment (i), water can be removed from the aqueous solution of the incipiently alkoxylated polypropylenimine obtained in the first sub-step. Such water removal can be done by heating to a temperature in the range of from 80 to 150° C. under a reduced pressure in the range of from 0.01 to 0.5 bar and distilling off the water.

In one embodiment of the present invention, the subsequent reaction with alkylene oxide(s) is effected typically at a reaction temperature in the range of from 70 to 200° C. and preferably from 100 to 180° C.

In one embodiment of the present invention, the subsequent reaction with alkylene oxide(s) is effected typically at a pressure of up to 10 bar and in particular up to 8 bar.

In one embodiment of the present invention, the reaction time of the subsequent reaction with alkylene oxide(s) is generally in the range of from 0.5 to 12 hours.

Examples of suitable organic solvents for embodiment (ii) are nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and 1,4-dioxane, furthermore N,N-dialkylamides such as dimethylformamide and dimethylacetamide, and N-alkyllactams such as N-methylpyrrolidone. It is as well possible to use mixtures of at least two of the above organic solvents. Preferred organic solvents are xylene and toluene.

In embodiment (ii), the solution obtained in the first step, before or after addition of catalyst and solvent, is dewatered before being subjected to alkylene oxide, said water removal advantageously being done by removing the water at a temperature in the range of from 120 to 180° C., preferably supported by a stream of nitrogen. The subsequent reaction with the alkylene oxide may be effected as in embodiment (i). In embodiment (i), the graft copolymer according to the invention is obtained directly in bulk and may be dissolved in water, if desired. In embodiment (ii), organic solvent is typically removed and replaced by water. The graft copolymers according to the invention may alternatively be isolated in bulk.

Having performed step (b) of the process according to the invention, graft copolymer according to the invention is obtained.

The process according to the invention may comprise or more work-up steps such as purifying the graft copolymer according to the invention.

In another embodiment, the process according to the invention comprises the following steps:
(a') providing a polypropylenimine with a linear polypropylenimine backbone that is free of hydroxyl groups,
(b') reacting the polypropylenimine according to step (a') with at least one alkylene oxide.

Polypropylenimines with a linear polypropylenimine backbone that is free of hydroxyl groups have been described above.

Step (b') of the process according to the invention can be performed analogously to step (b) of the process according to the invention.

Graft copolymers according to the invention are particularly useful as ingredient for formulations according to the invention.

If desired, it is possible to quaternize graft copolymers according to the invention or to sulfatize them. In particular, it is possible to quaternize and to sulfatize them.

Quaternization can be accomplished, for example, by reacting an graft copolymer according to the invention with an alkylation agent such as a $C_1$-$C_4$-alkyl halide, for example with methyl bromide, ethyl chloride, methyl iodide, n-butyl bromide, isopropyl bromide, or with a di-$C_1$-$C_4$-alkyl sulphate, optionally in the presence of a base, especially with dimethyl sulphate or with diethyl sulphate. Suitable bases are, for example, NaOH and KOH. The temperature for quaternization may be selected in the range of from 50 to 100° C., preferably in the range of from 60 to 80° C. In most cases, the alkylation reagent reacts quantitatively, but an access can be applied if complete quaternization is desired.

Combined quaternization and sulfatization can be achieved, e.g., by first reacting an alkoxylated polypropylenimine (A) with a di-$C_1$-$C_4$-alkyl sulphate in the presence of a base, then acidifying the reaction mixture obtained from quaternization, for example with a carboxylic acid, such as lactic acid, or with a mineral acid such as phosphoric acid, sulphuric acid or hydrochloric acid. In another embodiment, a quaternized alkoxylated polypropylenimine (A) can be reacted with a sulfatization reagent such as, but not limited to sulphuric acid (preferably 75 to 100% strength, more preferably 85 to 98% strength), oleum, SOS, chlorosulphuric acid, sulphuryl chloride, amidosulphuric acid and the like. If sulphuryl chloride is selected as sulphatization agent chloride can be removed by aqueous work-up after sulphatization.

The sulphatization agent is preferably used in equimolar or amounts or in excess, e.g. 1 to 1.5 moles per mol of OH-group of graft copolymer according to the invention, quaternized or not. Suitable temperatures for sulfatization are in the range of from zero to 100° C., preferably 5 to 50° C.

A further aspect of the present invention are polypropylenimines obtained according to step (a) of the process according to the invention described above. Polypropylenimines according to the present invention do not bear any hydroxyl groups, and their hydroxyl value is zero. A further aspect of the present invention is a process for making polypropylenimine, said process comprising step (a) of the process according to the invention described above.

The present invention is further illustrated by the following working examples.

General remarks: percentages are % by weight, unless expressly noted otherwise.

The amine values were determined according to ASTM D2074-07.

Test principles of the clean plate test: Ch. Nitsch et al. SÖFW Journal, 128, p. 23 ff. 2002.

NI: norm liters

EO: ethylene oxide unit, PO: propylene oxide unit

The amine value was determined according to DIN 53176.

The charge density of alkoxylated polypropylenimines (A) was always determined by titration as described below (see also: Horn, Prog. Colloid & Polym. Sci. 1978, 65, 251):

1 g of the alkoxylated polypropylenimine (A) in question was dissolved in 100 ml of demineralized water. A buffer solution and aqueous HCl were used to establish a pH of 4.0, determined potentiometrically. Three ml of an aqueous solution of toluidine blue (50 mg/l of water) were added, and N/400-KPVS (potassium polyvinyl sulfate) solution (Wako) with a concentration of 0.0004 meq/ml was titrated until the color changed from blue to pink. The charge density was calculated as follows:

$$LA = 0.4 \cdot KV$$

LA: Charge density of the modified polypropylenimine (A) in question, meq/g (milliequivalent/g)

KV: Consumption of the N/400-KPVS solution [ml]

I. Synthesis of Graft Copolymers According to the Invention

I.1 Step (a): Synthesis of Linear Polypropylenimines

I.1.1 Synthesis of Linear Polypropylenimine L-PPI.1

A 300 ml steel vessel connected to a tubular reactor with an inner diameter of 27 mm was charged with 200 ml 1,3-propylene diamine ("1,3-PDA"). From there, the 1,3-PDA was pumped continuously from the bottom of the vessel together with 50 Nl/h of a stream of hydrogen over a fixed-bed Ni/Co catalyst supported on $ZrO_2$ tablets (3-3 cm) that were located in the tubular reactor. The reaction temperature was 160° C. On top of the tubular reactor, the gas was separated from the liquid phase and the liquid circulated back into the steel-vessel. The reaction was continued for 2 hours. L-PPI.1 was obtained. Its properties are summarized in Table 1.

I.1.2 Synthesis of Linear Polypropylenimine L-PPI.2

The reaction according to I.1.1 was repeated, but the reaction time was 150 minutes. L-PPI.2 was obtained.

I.1.3 Synthesis of Linear Polypropylenimine L-PPI.3

The reaction according to 1.1.1 was repeated, but the reaction time was 90 minutes. L-PPI.3 was obtained.

I.1.4 Synthesis of Linear Polypropylenimine L-PPI.4

In a tubular reactor with an inner diameter of 27 mm, 1,3-PDA was fed continuously, together with 10 Nl/h hydrogen gas, over a fixed bed catalyst consisting of Co as the active metal. The pressure was 50 bar, the temperature 170° C. 1,3-PDA was fed into the reactor with 0.8 kg/$L_{cat}$·h. A crude product was obtained. After distilling off the unreacted 1,3-PDA, the dimer and trimer of 1,3-PDA from the crude product, L-PPI.4 was obtained as a colourless liquid. Its properties are summarized in Table 1.

I.1.5 Synthesis of Linear Polypropylenimine L-PPI.5

In a tubular reactor with an inner diameter of 27 mm, 1,3-PDA was fed continuously, together with 10 Nl/h hydrogen gas, over a fixed bed catalyst consisting of Co as the active metal. The pressure was 50 bar, the temperature 160° C. 1,3-PDA was fed into the reactor with 0.8 kg/$L_{cat}$·h. A crude product was obtained. After distilling off the unreacted 1,3-PDA, the dimer and trimer of 1,3-PDA from the crude product, L-PPI.4 was obtained as a colourless liquid. Its properties are summarized in Table 1.

I.1.6 Synthesis of Linear Polypropylenimine L-PPI.6

In a tubular reactor with an inner diameter of 27 mm, 1,3-PDA was fed continuously, together with 10 Nl/h hydrogen gas, over a fixed bed catalyst consisting of Co as the active metal. The pressure was at 50 bar, the temperature at 160° C. 1,3-PDA was fed into the reactor with 0.6 kg/$L_{cat}$·h. The crude product so obtained showed 7% of remaining 1,3-PDA based on factorized GC-area %. After distilling off the unreacted 1,3-PDA, the dimer and trimer of 1,3-PDA from the crude product, L-PPI.6 was obtained as a colourless liquid. Mn: 302 g/mol, $M_w$:533 g/mol and $M_w/M_n$: 1.8.

TABLE 1

Linear polypropylenimines and their properties

| No. | PAV | SAV | PAV/SAV | $M_n$ [g/mol] | Mw/Mn |
|---|---|---|---|---|---|
| L-PPI.1 | 129 | 923 | 1:7.15 | 872 | 3.4 |
| L-PPI.2 | 228 | 826 | 1:3.6 | 474 | 3.4 |
| L-PPI.3 | 228 | 482 | 1:2.1 | 300 | 2.5 |
| L-PPI.4 | 203 | 816 | 1:4.0 | 525 | 1.6 |
| L-PPI.5 | 269 | 786 | 1:2.9 | 409 | 2.3 |
| L-PPI.6 | 206 | 841 | 1:4.1 | 302 | 1.8 |

PAV: primary amine value
SAV: secondary amine value

Primary and secondary amine values in mg KOH/g.
Nl: norm liter

I.2 Step (b): Alkoxylation of Linear Polypropylenimines

I.2.1 Alkoxylation with Molar Ratio EO/NH of 1:1

A 2-litre autoclave was charged with 286.3 g of L-PPI.1 (tertiary amine value: 22.1 mg KOH/g) and 14.3 g water. The autoclave was purged three times with nitrogen and then heated to 110° C. An amount of 265.2 g ethylene oxide was added within two hours. To complete the reaction, the reaction mixture was stirred at 110° C. for 3 hours. Water and volatile compounds, if present, were removed at reduced pressure (10 mbar) at 90° C. Graft copolymer according to the invention GC.1 was obtained as highly viscous yellow oil (522 g).

I.2.2 Alkoxylation with Molar Ratio EO/NH of 10:1

A 2-litre autoclave was charged with 76.9 g of GC.1 and 1.6 g KOH (pellets, 50% by weight KOH, rest water). The autoclave was heated under reduced pressure (10 mbar) to 120° C. and stirred for two hours to remove the water. Then, the autoclave was purged three times with nitrogen and then heated to 140° C. under a pressure of 1 bar. An amount of 332.8 g ethylene oxide was added within two hours. To complete the reaction, the reaction mixture was stirred at 140° C. for 3 hours. Water and volatile compounds, if present, were removed under reduced pressure (10 mbar) at 90° C. Graft copolymer according to the invention GC.2 was obtained as slightly yellow waxy solid (399.5 g).

I.2.3 Alkoxylation with Molar Ratio EO/NH of 20:1

A 2-litre autoclave was charged with 64.0 g of GC.1 and 2.6 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under a pressure of 1 bar. An amount of 584.7 g ethylene oxide was added within four hours. To complete the reaction, the reaction mixture was stirred at 140° C. for three hours. Water and volatile compounds, if present, were removed under reduced pressure (10 mbar) at 90° C. Graft copolymer according to the invention GC.3 was obtained as slightly yellow waxy solid (630.6 g). Amine value: 57.2 mg KOH/g.

I.2.4 Alkoxylation with Molar Ratio EO/PO/NH of 10:7:1

A 2-litre autoclave was charged with 225.6 g of GC.2 and 0.8 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under a pressure of 1 bar. An amount of 187.9 g propylene oxide was added within two hours. To complete the reaction, the reaction mixture was stirred at 140° C. for three hours. Water and volatile compounds, if present, were removed under reduced pressure (10 mbar) at 90° C. Graft copolymer according to the invention GC.4 was obtained as slightly yellow waxy solid (405 g). Amine value: 58.3 mg KOH/g.

I.2.5 Alkoxylation with Molar Ratio EO//PO/NH of 24:16:1

A 2-litre autoclave was charged with 242.8 g of GC.3 and 1.1 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under pressure of 1 bar. An amount of 46.1 g ethylene oxide was added and allowed to react for 3 hours. Then, an amount of 242.9 g propylene oxide was added within two hours. To complete the reaction, the reaction mixture was stirred at 140° C. for three hours. Water and volatile compounds, if present, were removed under reduced pressure (10 mbar) at 90° C. Graft copolymer according to the invention GC.5 was obtained as light brown solid (506 g). Amine value: 28.6 mg KOH/g.

I.2.6 Alkoxylation with Molar Ratio BuO/NH of 1:1

A 2-litre autoclave was charged with 193.7 g of L-PPI.1 and 9.7 g water. The autoclave was purged three times with nitrogen and then heated to 110° C. An amount of 293.6 g butylene-1,2-oxide was added within two hours. To complete the reaction, the reaction mixture was stirred at 110° C. for 3 hours. Water and volatile compounds, if present, were removed in vacuo (10 mbar) at 90° C. Graft copolymer according to the invention GC.6 was obtained as highly viscous yellow oil (460 g).

I.2.7 Alkoxylation with Molar Ratio BuO/NH of 3:1

A 2-litre autoclave was charged with 232.4 g of GC.6 and 2.0 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under pressure of 1 bar. An amount of 280 g butylene-1,2-oxide was added within two hours. To complete the reaction, the reaction mixture was stirred at 140° C. for three hours. Water and volatile compounds, if present, were removed under reduced pressure (10 mbar) at 90° C. Graft copolymer according to the invention GC.7 was obtained as light brown solid (475.1 g). Amine value: 200.8 mg KOH/g.

I.2.8 Alkoxylation with Molar Ratio PO/NH of 1:1

A 2-litre autoclave was charged with 204.4 g of L-PPI.1 and 10.2 g water. The autoclave was purged three times with nitrogen and then heated to 110° C. An amount of 249.6 g propyleneoxide was added within two hours. To complete the reaction, the reaction mixture was stirred at 110° C. for 3 hours. Water and volatile compounds, if present, were removed in vacuo (10 mbar) at 90° C. Graft copolymer according to the invention GC.8 was obtained as highly viscous yellow oil (453 g).

I.2.9 Alkoxylation with Molar Ratio PO/NH of 16:1

A 2-litre autoclave was charged with 73.8 g of GC.8 and 2.7 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under pressure of 1 bar. An amount of 608.6 g propylene oxide was added within two hours. To complete the reaction, the reaction mixture was stirred at 140° C. for five hours. Water and volatile compounds, if present, were removed under reduced pressure (10 mbar) at 90° C. Graft copolymer according to the invention GC.9 was obtained as yellow viscous oil (660.4 g). Amine value: 54.4 mg KOH/g.

I.2.10 Alkoxylation with Molar Ratio EO/PO/NH of 24:16:1

A 2-litre autoclave was charged with 281.9 g of GC.9 and 1.2 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under pressure of 1 bar. An amount of 305.2 g ethylene oxide was added within two hours. To complete the reaction, the reaction mixture was stirred at 140° C. for three hours. Water and volatile compounds, if present, were removed under reduced pressure (10 mbar) at 90° C. Graft copolymer according to the invention GC.10 was obtained as yellow viscous oil (547.4 g). Amine value: 28.1 mg KOH/g.

I.2.11 Alkoxlation with Molar Ratio EO/NH of 30:1

A 2-litre autoclave was charged with 424.0 g of GC.3 and 1.0 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under pressure of 1 bar. An amount of 201.1 g of ethylene oxide was added within two hours. To complete the reaction, the reaction mixture was stirred at 140° C. for three hours. Water and volatile compounds, if present, were removed under reduced pressure (10 mbar) at 90° C. Graft copolymer according to the invention GC.11 was obtained as light brown viscous oil (603 g). Amine value: 39.3 mg KOH/g.

1.2.12 Alkoxlation with Molar Ratio EO/NH of 40:1

A 2-litre autoclave was charged with 210.0 g of GC.11 and 0.6 g KOH (pellets, 50% by weight KOH, rest water). The autoclave was heated under reduced pressure (10 mbar) to 120° C. and stirred for two hours to remove water. Then, the autoclave was purged three times with nitrogen and then heated to 140° C. under pressure of 1 bar. An amount of 67.6 g of ethylene oxide was added within 30 minutes. To complete the reaction, the reaction mixture was stirred at 140° C. for three hours. Water and volatile compounds, if present, were removed under reduced pressure (10 mbar) at 90° C. Graft copolymer according to the invention GC.12 was obtained as light brown solid (275 g). Amine value: 30.9 mg KOH/g.

I.2.13 Alkoxylation with Molar Ratio EO/NH of 1:1

A 2-litre autoclave was charged with 190.9 g of L-PPI.2 and 9.5 g water. The autoclave was purged three times with nitrogen and then heated to 110° C. An amount of 191.8 g ethylene oxide was added within two hours. To complete the reaction, the reaction mixture was stirred at 110° C. for 3 hours. Water and volatile compounds, if present, were removed in vacuo (10 mbar) at 90° C. Graft copolymer according to the invention GC.13 was obtained as highly viscous yellow oil (340 g).

1.2.14 Alkoxylation with Molar Ratio EO/NH of 20:1

A 2-litre autoclave was charged with 60.0 g of GC.13 and 1.3 g $KOC(CH_3)_3$. The autoclave was purged three times with nitrogen and then heated to 140° C. under pressure of 1 bar. An amount of 571.3 g of ethylene oxide was added within 3 hours. To complete the reaction, the reaction mixture was stirred at 140° C. for three hours. Water and volatile compounds, if present, were removed under reduced pressure (10 mbar) at 90° C. Graft copolymer according to the invention GC.14 was obtained as light brown solid (624.4 g). Surface tension (1 g/l, 25° C.): 60.3 mN/m, determined according to EN 14370.

1.2.15 Quaternization of an Alkoxylated Polypropylenimine

In a 250 ml reaction vessel with a nitrogen inlet, a quantity of 160 g GC.3 was heated to 70° C. under a constant stream of nitrogen. 20.56 dimethyl sulphate were added dropwisely, the temperature being maintained at 70 to 75° C. After the addition of the dimethyl sulfate had been completed the reaction mixture so obtained was stirred for two hours at 70° C. under nitrogen and then cooled to room temperature. Then, the pH value (measured 10% in water) was adjusted to 9.4 with 3.2 g sodium hydroxide (50% in water). 178 g graft copolymer according to the invention GC.15 were obtained as a brown solid (amine value: 0.0 mg KOH/g). The degree of quaternization was 100%.

1.2.16 Sulfatization of a Quaternized Alkoxylated Polypropylenimine 1.6 g concentrated $H_2SO_4$ (96%) were added to 70.0 g of GC.15 at 60° C. under nitrogen atmosphere. The temperature was raised to 90° C. and the mixture was set under vacuum (15 mbar) for 3 hours. After cooling to 60° C. the pH was adjusted with 1.5 g sodium hydroxide (50% solution in water) to 9.4. An amount of 65 g graft copolymer according to the invention GC.16 was obtained as a brown solid.

II. Manufacture of Reference Formulations, Formulations According to the Invention and of Comparative Formulations II.1 Manufacture of Reference Formulations The following ingredients were used:

(A.1): GC.3
(A.2): GC.5
(B1.1): n-$C_8$-$C_{10}$-alkyl polyglcucoside, x=1.4, molar ratio of n-$C_8$-alkyl polyglcucoside to n-$C_{10}$alkyl polyglcucoside 45:55.
(B2.1): n-$C_5H_{11}$CH(n-$C_3H_7$)—$CH_2$-$EO_8$
(C.1): $C_{12}H_{25}$—(OCH$_2$CH$_2$)$_2$O—SO$_3$Na
(C.2): cocamido propyl betaine
(C.3): n-dodecyl dimethyl amine oxide The reference formulations were made by mixing half a liter of water with the respective amounts of surfactants (B) and (C) with 50 ml of ethanol and adding water to one kg. The composition of the reference formulations RF.1 to RF.14 and the tests with such reference formulations has been summarized in Table 2.

III. Hand Dish-Wash Tests of Formulations According to the Invention and of Comparative Formulations III.1 Olive Oil Test In a 2500 ml beaker, 1000 g distilled water were placed together with 1 g of the corresponding reference formulation, formulation according to the invention or comparative formulation, respectively. The resulting solution was then heated either to 45° C. or to 25° C. by using a magnetic stirrer with heating plate and adjustable contact thermometer. Generation of foam took place by stirring 2 minutes long with a rotational speed of 400 rounds per minute. Then, 0.40 ml olive oil were added stepwise automatically in intervals of one minute using a Dosimat 665 from Metrohm with a 20 mL exchangeable dosing unit. End of the evaluation is reached when the surface of the dishwashing solution was completely free of foam. Finally, registration of the amount of olive oil in ml added to this point takes place. The more olive oil has to be added, the more efficient is the respective dish-wash formulation.

III.2 Clean Plate Test

It is a method suitable for dishwashing liquids and recommended by IKW, which determines the foam stability in the presence of mixed soil and/or fat.

Plates are soiled using two different types of tests soils (IKWII and Lard). See test conditions on the tables below.

TABLE 2

Reference formulations and their properties

|  | C-RF.1 | RF.2 | RF.3 | RF.4 | RF.5 | RF.6 | RF.7 | C-RF.8 |
|---|---|---|---|---|---|---|---|---|
| (B1.1) | — | 4.5 | 2 | 1 | — | — | 2 | — |
| (B2.1) | — | — | — | — | 4.5 | 2.5 | 2.5 | — |
| (C.1) | 21 | 16.5 | 20 | 20 | 16.5 | 18.5 | 17.5 | 21 |
| (C.2) | 7 | 7 | 7 | 7 | 7 | 7 | 7 | — |
| (C.3) | — | — | — | — | — | — | — | 7 |
| pH value | 7 | 7 | 7 | 7 | 7 | 7 | 7 | 8 |
| Oil test 1 | 37 | 51 | 43 | 42 | 50 | 46 | 58 | 40 |
| Oil test 2 | 28 | 45 | 35 | 36 | 44 | 41 | 51 | 25 |
| Clean plates 1 | 16 | 22 | 20 | 20 | 23 | 21 | 23 | 17 |
| Clean plates 2 | 20 | 25 | 24 | 22 | 27 | 25 | 26 | 19 |
| Clean plates 3 | 13 | 19 | 19 | 17 | 21 | 19 | 21 | 16 |

|  | RF.9 | RF.10 | RF.11 | RF.12 | RF.13 | RF.14 |
|---|---|---|---|---|---|---|
| (B1.1) | 4.5 | 2 | 1 | — | — | 2 |
| (B2.1) | — | — | — | 4.5 | 2.5 | 2.5 |
| (C.1) | 16.5 | 20 | 20 | 16.5 | 18.5 | 17.5 |
| (C.2) | — | — | — | — | — | — |
| (C.3) | 7 | 7 | 7 | 7 | 7 | 7 |
| pH value | 8 | 8 | 8 | 8 | 8 | 8 |
| Oil test 1 | 55 | 48 | 40 | 49 | 46 | 53 |
| Oil test 2 | 40 | 38 | 36 | 38 | 36 | 46 |
| Clean plates 1 | 23 | 20 | 18 | 21 | 19 | 22 |
| Clean plates 2 | 25 | 23 | 24 | 27 | 26 | 27 |
| Clean plates 3 | 23 | 21 | 19 | 23 | 20 | 21 |

All quantities in % by weight, based upon the total weight of the respective reference formulation.
Oil test 1: olive oil test at 45° C., in ml olive oil
Oil test 2: olive oil test at 25° C., in ml olive oil
Clean plates 1: number of clean plates, lard, 50° C.
Clean plates 2: number of clean plates, ITWII soil, 45° C.
Clean plates 3: number of clean plates, ITWII soil, 22° C.

For making formulations according to the invention or comparative formations, the amount of (A) or ethoxylated polyethylene oxide was added to the respective reference formulation.

The composition of the formulations according to the invention and the comparative formulations has been summarized in Table 3.

The following ethoxylated polyethylenimine was used for comparative purposes: ethoxylated polyethylenimine, 20 EO/NH group, Mn: 30,000 g/mol.

IKWII soil: 60 5 by weight fat, 30% by weight carbohydrates, 10% by weight of proteins Each plate was soiled with 1.7 g of lard (clean plates 1) or 5.0 g of IKWII soil (clean plates 2, clean plates 3).

The water applied had a hardness of 16° dH. An amount of 5 litres water were placed together with 2 g (clean plates 2, clean plates 3) or 1 g (clean plates 1) of the corresponding reference formulation, formulation according to the invention or comparative formulation, respectively, into a bucket with stirrer.

TABLE 3

Formulations according to the invention, comparative formulations, and their properties

|  | C-AF.1 | C-AF.2 | AF.3 | AF.4 | C-AF.5 | AF.6 | C-AF.7 | AF.8 |
|---|---|---|---|---|---|---|---|---|
| (A): GC.3 | — | — | 0.35 | 0.16 | — | 0.35 | — | 0.35 |
| PEI | 0.35 | 0.35 | — | — | 0.35 | — | 0.35 | — |
| RF | C-RF.1 | RF.3 | RF.3 | RF.4 | RF.5 | RF.5 | RF.7 | RF.7 |
| Oil test 1 | 41 | 68 | 72 | 65 | 65 | 60 | 71 | 73 |
| Oil test 2 | 33 | 61 | 70 | 62 | 60 | 65 | 69 | 72 |
| Clean plates 1 | 18 | 27 | 30 | 26 | 25 | 27 | 28 | 32 |
| Clean plates 2 | 22 | 29 | 31 | 28 | 28 | 30 | 31 | 33 |
| Clean plates 3 | 16 | 26 | 29 | 24 | 26 | 28 | 29 | 32 |

|  | AF.9 | AF.10 | C-AF.11 | AF.12 | AF.13 | C-AF.14 | AF.15 |
|---|---|---|---|---|---|---|---|
| (A): GC.5 | 0.35 | 2.0 | — | 0.35 | 0.16 | — | 0.35 |
| PEI | — | — | 0.35 | — | — | 0.35 | — |
| RF | RF.9 | RF.10 | RF.10 | RF.10 | R.10 | R.14 | R.14 |
| Oil test 1 | 64 | 63 | 70 | 74 | 68 | 71 | 73 |
| Oil test 2 | 61 | 51 | 66 | 71 | 65 | 70 | 71 |
| Clean plates 1 | 26 | 24 | 28 | 31 | 27 | 29 | 31 |
| Clean plates 2 | 27 | 25 | 29 | 32 | 29 | 31 | 32 |
| Clean plates 3 | 25 | 22 | 28 | 31 | 28 | 30 | 31 |

All quantities in % by weight, based upon total formulation
A difference of two plates is considered to be significant.

If the above tests are repeated with aqueous formations according to the invention comprising any of the other graft copolymers according to the invention excellent results will be obtained as well.

The invention claimed is:

1. An aqueous formulation comprising
   (A) at least one alkoxylated polypropylenimine, wherein the at least one alkoxylated polypropylenimine
      (A) is selected from alkoxylated polypropylenimines
      (A) having a linear polypropylenimine backbone, and
   (B) at least one non-ionic surfactant, selected from the group consisting of
      (B1) an alkyl polyglycosid and
      (B2) an alkoxylated $C_8$-$C_{14}$-Guerbet alcohol.

2. The aqueous formulation according to claim 1, wherein the at least one alkoxylated polypropylenimine (A) is selected from those with a polypropylenimine backbone having a molecular weight $M_n$ of from 300 to 4,000 g/mol.

3. The aqueous formulation according to claim 1, wherein the at least one alkoxylated polypropylenimine (A) is selected from those having alkylene oxide units and N atoms in a molar ratio of from 1:1 to 100:1.

4. The aqueous formulation according to claim 1, wherein the linear polypropylenimine backbone bears no hydroxyl groups.

5. The aqueous formulation according to claim 1, wherein the alkyl polyglycoside (B1) is present and is selected from compounds having the following formula (I):

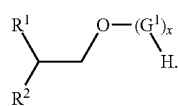

(I)

wherein
   $R^1$ is hydrogen or $C_1$-$C_4$-alkyl, linear or branched,
   $R^2$ is $C_3$-$C_{12}$-alkyl, linear or branched,
   $G^1$ selected from monosaccharides having from 4 to 6 carbon atoms,
   x is from 1.1 to 3.

6. The aqueous formulation according to claim 1, wherein the alkoxylated Guerbet $C_8$-$C_{14}$-Guerbet alcohol (B2) is present and is selected from alkoxylated $C_8$-$C_{14}$-Guerbet alcohols having from 3 to 40 alkoxide units per mole.

7. The aqueous formulation according to claim 1, comprising at least one surfactant (C) selected from the group consisting of an anionic surfactant, amphoteric surfactant and amine oxide surfactant.

8. The aqueous formulation according to claim 1, comprising:
   (A) in total from 0.1 to 1.0% by weight of the at least one alkoxylated polypropylenimine,
   (B) in total from 0.5 to 5.0% by weight of the at least one nonionic surfactant, and
   (C) optionally, from 0.1 to 38.5% by weight of at least one surfactant, selected from the group consisting of an anionic surfactant, amphoteric surfactant and amine oxide surfactant,
   percentages being based on the total weight of the aqueous formulation.

9. A process for cleaning a hard surface, wherein the hard surface is selected from the group consisting of a part of a dishware, glass, cutlery, and kitchen utensil, comprising applying the aqueous formulation according to claim 1 to the surface.

10. A process for manufacturing the aqueous formulation according to claim 1, comprising mixing at least one nonionic surfactant (B) with water and, optionally, with at least one surfactant (C), and then adding at least one alkoxylated polypropylenimine (A).

* * * * *

UNITED STATES PATENT AND TRADEMARK OFFICE
CERTIFICATE OF CORRECTION

PATENT NO. : 10,662,397 B2
APPLICATION NO. : 14/763203
DATED : May 26, 2020
INVENTOR(S) : Sophia Ebert et al.

Page 1 of 2

It is certified that error appears in the above-identified patent and that said Letters Patent is hereby corrected as shown below:

In the Specification

Column 1, Line 65, "polyproplylenimine" should read -- polypropylenimine --,

Column 2, Line 1, "N-atoms" should read -- N atoms --,
    Line 12, "(NH" should read -- NH --,
    Line 26 (approx.), "alkylenamino" should read -- alkylenamine --,
    Line 27 (approx.), "NH$_2$ groups" should read -- NH$_2$-groups --, and
    Line 56, "propiol" should read -- propanediol --, Column 3, Line 2, "aminoalcohols" should read -- amino alcohols --,
    Lines 23-24, "aminoethoxyl)" should read -- aminoethoxy) --,
    Line 25, "N-npropylethanolamine," should read -- N-n-propylethanolamine, --,
    Line 31, "aminoalcohol" should read -- amino alcohol --, and
    Line 53, "gylcol," should read -- glycol, --, Column 4, Line 27, "ethylendiamine" should read -- ethylenediamine --, Column 5, Line 58, "Ru" should read -- [Ru --, Column 6, Line 2, "H2O]," should read -- H$_2$O], --,
    Line 6, "H2O]," should read -- H$_2$O], --, and
    Line 15, "cyclopentdienyl" should read -- cyclopentadienyl --, Column 7, Line 17, "ethylendiamine" should read -- ethylenediamine --, Column 8, Lines 64-65, "pentylenoxide" should read -- pentylene oxide --, Column 11, Line 21, "M$_w$/M$_n$," should read -- M$_w$/M$_n$ --, Signed and Sealed this
Twenty-second Day of September, 2020

Andrei Iancu
*Director of the United States Patent and Trademark Office*

Column 12, Line 35 (approx.), "or or" should read -- or --, and
    Line 40 (approx.), "cocamidylpropyl" should read -- cocamidopropyl --, Column 14, Line 21, "N-atoms" should read -- N atoms --,
    Line 30, "(NH" should read -- NH --,
    Line 51, "can have can have" should read -- can have --, and
    Line 66, "$^{15}$N NMR" should read -- $^{15}$N-NMR --, Column 16, Line 51, "ethylendiamine" should read -- ethylenediamine --, Column 20, Line 9, "SOS," should read -- $SO_3$, --, Column 21, Line 9, "1.1.1" should read -- I.1.1 --,
    Line 39, "GC-area %." should read -- GC-area%. --,
    Line 42, "Mn:" should read -- $M_n$: --, and
    Line 47 (approx.), "Mw/Mn" should read -- $M_w/M_n$ --, Column 23, Line 22, "propyleneoxide" should read -- propylene oxide --, and
    Line 57, "Alkoxlation" should read -- Alkoxylation --, Column 24, Line 4 (approx.), "Alkoxlation" should read -- Alkoxylation --, and
    Line 42 (approx.), "1 g/I," should read -- (1 g/l, --, Column 25, Line 9, "polyglcucoside," should read -- polyglycoside, --,
    Line 10, "polyglcucoside to n-$C_{10}$alkyl polyglcucoside" should read -- polyglycoside to n-$C_{10}$-alkyl polyglycoside, --, and
    Line 67, "Mn:" should read -- $M_n$: --.

In the Claims

Column 27, Line 39 (approx.), Claim 1, "polyglycosid" should read -- polyglycoside --, and Column 27, Line 58, Claim 5, "  "

should read -- 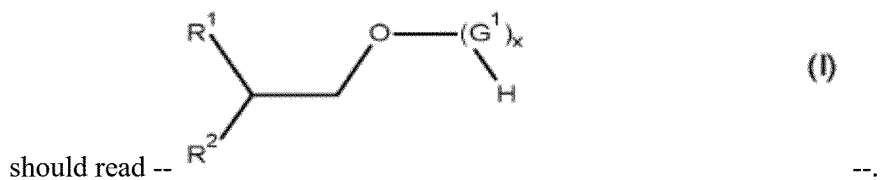 --.